(12) United States Patent
Mosko

(10) Patent No.: US 9,282,050 B2
(45) Date of Patent: Mar. 8, 2016

(54) SYSTEM AND METHOD FOR MINIMUM PATH MTU DISCOVERY IN CONTENT CENTRIC NETWORKS

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 212 days.

(21) Appl. No.: 14/067,857

(22) Filed: Oct. 30, 2013

(65) Prior Publication Data

US 2015/0117452 A1    Apr. 30, 2015

(51) Int. Cl.
| | | |
|---|---|---|
| H04L 12/56 | (2006.01) | |
| H04L 12/26 | (2006.01) | |
| H04L 12/24 | (2006.01) | |
| H04L 12/805 | (2013.01) | |
| H04L 12/725 | (2013.01) | |
| H04L 29/06 | (2006.01) | |

(52) U.S. Cl.
CPC ............ *H04L 47/365* (2013.01); *H04L 45/306* (2013.01); *H04L 69/166* (2013.01)

(58) Field of Classification Search
CPC ....... H04L 47/10; H04L 47/36; H04L 47/365; H04L 69/166
See application file for complete search history.

(56) References Cited

U.S. PATENT DOCUMENTS

| | | | |
|---|---|---|---|
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,629,370 A | 5/1997 | Freidzon | |
| 5,870,605 A | 2/1999 | Bracho | |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009}.

(Continued)

*Primary Examiner* — Wutchung Chu
(74) *Attorney, Agent, or Firm* — Shun Yao; Park, Vaughan, Fleming & Dowler LLP

(57) ABSTRACT

One embodiment of the present invention provides a system for facilitating fragmentation of packets with hierarchically structured variable-length identifiers (HSVLIs). During operation, the system receives an interest packet with an HSVLI corresponding to a piece of content. The system then identifies a minimum path maximum transmission unit (MTU) value carried in the packet. In response to the piece of content not being stored locally, the system then determines an egress port for the packet based on the HSVLI. The system further determines an MTU associated with the egress port. Subsequently, in response to the MTU associated with the egress port being less than the minimum path MTU value carried in the packet, the system updates the minimum path MTU value in the packet to the MTU value associated with the egress port.

21 Claims, 6 Drawing Sheets

(56) References Cited

U.S. PATENT DOCUMENTS

| | | |
|---|---|---|
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,257,837 B2 | 8/2007 | Xu |
| 7,287,275 B2 | 10/2007 | Moskowitz |
| 7,315,541 B1 | 1/2008 | Housel |
| 7,350,229 B1 | 3/2008 | Lander |
| 7,382,787 B1 | 6/2008 | Barnes |
| 7,444,251 B2 | 10/2008 | Nikovski |
| 7,496,668 B2 | 2/2009 | Hawkinson |
| 7,509,425 B1 | 3/2009 | Rosenberg |
| 7,542,471 B2 * | 6/2009 | Samuels ............... H04L 69/16 370/392 |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,685,290 B2 | 3/2010 | Satapati |
| 7,698,463 B2 | 4/2010 | Ogier |
| 7,779,467 B2 * | 8/2010 | Choi et al. .................. 726/22 |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,665,757 B2 | 3/2014 | Kling |
| 8,667,172 B2 | 3/2014 | Ravindran |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,817,594 B2 | 8/2014 | Gero |
| 8,826,381 B2 | 9/2014 | Kim |
| 2002/0010795 A1 | 1/2002 | Brown |
| 2002/0048269 A1 | 4/2002 | Hong |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0199014 A1 | 12/2002 | Yang |
| 2003/0046437 A1 | 3/2003 | Eytchison |
| 2003/0048793 A1 * | 3/2003 | Pochon et al. ............... 370/401 |
| 2003/0051100 A1 | 3/2003 | Patel |
| 2003/0074472 A1 | 4/2003 | Lucco |
| 2003/0140257 A1 | 7/2003 | Paterka |
| 2004/0024879 A1 | 2/2004 | Dingman |
| 2004/0030602 A1 | 2/2004 | Rosenquist |
| 2004/0071140 A1 * | 4/2004 | Jason ...................... H04L 47/10 370/392 |
| 2004/0139230 A1 | 7/2004 | Kim |
| 2004/0221047 A1 | 11/2004 | Grover |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0259637 A1 | 11/2005 | Chu |
| 2005/0262217 A1 | 11/2005 | Nonaka |
| 2005/0281288 A1 * | 12/2005 | Banerjee ............... H04L 47/10 370/477 |
| 2005/0289222 A1 | 12/2005 | Sahim |
| 2006/0010249 A1 | 1/2006 | Sabesan |
| 2006/0029102 A1 * | 2/2006 | Abe et al. .................. 370/474 |
| 2006/0039379 A1 * | 2/2006 | Abe et al. .................. 370/394 |
| 2006/0051055 A1 | 3/2006 | Ohkawa |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 * | 7/2007 | Morishita et al. ......... 370/395.31 |
| 2007/0171828 A1 * | 7/2007 | Dalal .................. H04L 47/365 370/235 |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2008/0005056 A1 | 1/2008 | Stelzig |
| 2008/0010366 A1 | 1/2008 | Duggan |
| 2008/0037420 A1 * | 2/2008 | Tang ............................. 370/229 |
| 2008/0046340 A1 | 2/2008 | Brown |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 * | 6/2008 | Artan et al. ................... 707/102 |
| 2008/0133755 A1 | 6/2008 | Pollack |
| 2008/0159271 A1 | 7/2008 | Kutt |
| 2008/0165775 A1 * | 7/2008 | Das .................... H04L 47/36 370/392 |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0270618 A1 | 10/2008 | Rosenberg |
| 2008/0287142 A1 | 11/2008 | Keighran |
| 2008/0288580 A1 | 11/2008 | Wang |
| 2008/0298376 A1 * | 12/2008 | Takeda ................ H04L 12/2697 370/400 |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 * | 3/2009 | Nagai et al. ................... 370/392 |
| 2009/0077184 A1 | 3/2009 | Brewer |
| 2009/0097631 A1 | 4/2009 | Gisby |
| 2009/0103515 A1 | 4/2009 | Pointer |

(56) References Cited

U.S. PATENT DOCUMENTS

| | | |
|---|---|---|
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0228593 A1 | 9/2009 | Takeda |
| 2009/0268905 A1 | 10/2009 | Matsushima |
| 2009/0287835 A1 | 11/2009 | Jacobson |
| 2009/0288163 A1 | 11/2009 | Jacobson |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0195653 A1 | 8/2010 | Jacobson |
| 2010/0195654 A1 | 8/2010 | Jacobson |
| 2010/0195655 A1* | 8/2010 | Jacobson et al. .............. 370/392 |
| 2010/0232402 A1 | 9/2010 | Przybysz |
| 2010/0232439 A1 | 9/2010 | Dham |
| 2010/0235516 A1 | 9/2010 | Nakamura |
| 2010/0250939 A1 | 9/2010 | Adams |
| 2010/0268782 A1 | 10/2010 | Zombek |
| 2010/0284309 A1 | 11/2010 | Allan |
| 2010/0284404 A1 | 11/2010 | Gopinath |
| 2010/0322249 A1* | 12/2010 | Thathapudi et al. ....... 370/395.1 |
| 2011/0022812 A1 | 1/2011 | vanderLinden |
| 2011/0055392 A1 | 3/2011 | Shen |
| 2011/0055921 A1* | 3/2011 | Narayanaswamy et al. .... 726/22 |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0271007 A1 | 11/2011 | Wang |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011551 A1 | 1/2012 | Levy |
| 2012/0036180 A1 | 2/2012 | Thornton |
| 2012/0066727 A1 | 3/2012 | Nozoe |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0179653 A1 | 7/2012 | Araki |
| 2012/0198048 A1* | 8/2012 | Ioffe et al. ..................... 709/224 |
| 2012/0221150 A1 | 8/2012 | Arensmeier |
| 2012/0224487 A1 | 9/2012 | Hui |
| 2012/0290669 A1 | 11/2012 | Parks |
| 2012/0290919 A1 | 11/2012 | Melnyk |
| 2012/0291102 A1 | 11/2012 | Cohen |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219081 A1 | 8/2013 | Qian |
| 2013/0223237 A1 | 8/2013 | Hui |
| 2013/0227166 A1* | 8/2013 | Ravindran et al. ............ 709/238 |
| 2013/0242996 A1 | 9/2013 | Varvello |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0082135 A1 | 3/2014 | Jung |
| 2014/0089454 A1 | 3/2014 | Jeon |
| 2014/0129736 A1 | 5/2014 | Yu |
| 2014/0172981 A1 | 6/2014 | Kim |
| 2014/0173034 A1 | 6/2014 | Liu |
| 2014/0195328 A1 | 7/2014 | Ferens |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0282816 A1 | 9/2014 | Xie |
| 2014/0289325 A1 | 9/2014 | Solis |
| 2014/0289790 A1 | 9/2014 | Wilson |

FOREIGN PATENT DOCUMENTS

| | | |
|---|---|---|
| EP | 0295727 A2 | 12/1988 |
| EP | 0757065 A2 | 7/1996 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

B. Lynn. The Pairing-Based Cryptography Library, http://crypto.stanford.edu/pbc/.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

(56) References Cited

OTHER PUBLICATIONS

J. Shao and Z. Cao. CCA-Secure Proxy Re-Encryption without Pairings. Public Key Cryptography. Springer Lecture Notes in Computer Sciencevol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/ www.adobe.com/ content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http:// www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/ Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/ web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug.2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.

(56) References Cited

OTHER PUBLICATIONS

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.

(56) References Cited

OTHER PUBLICATIONS

S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.

\* cited by examiner

SYSTEM AND METHOD FOR MINIMUM PATH MTU DISCOVERY IN CONTENT CENTRIC NETWORKS

RELATED APPLICATION

The subject matter of this application is related to the subject matter in the following applications:

U.S. patent application Ser. No. 12/565,005, now U.S. patent Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, now U.S. patent Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, now Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

the disclosures of which are incorporated by reference in their entirety.

BACKGROUND

1. Field

The present disclosure relates generally to facilitating communication over a data network. More specifically, the present disclosure relates to a system and method for facilitating minimum path maximum transmission unit (MTU) in content centric networks.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

Recently, content centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with meta-data describing or augmenting the piece of content with information such as authentication data, creation date, content owner, etc.

In CCN, content objects and interests are identified by their names, which are typically hierarchically structured variable-length identifiers (HSVLI). Generally, interests and content objects travel through a number of links before they can reach their destination. Each link could have its own maximum transmission unit (MTU). These different MTU limits impose different fragmentation requirements to the data being transferred.

SUMMARY

One embodiment of the present invention provides a system for facilitating fragmentation of packets with hierarchically structured variable-length identifiers (HSVLIs). During operation, the system receives an interest packet with an HSVLI corresponding to a piece of content. The system then identifies a minimum path maximum transmission unit (MTU) value carried in the packet. In response to the piece of content not being stored locally, the system then determines an egress port for the packet based on the HSVLI. The system further determines an MTU associated with the egress port. Subsequently, in response to the MTU associated with the egress port being less than the minimum path MTU value carried in the packet, the system updates the minimum path MTU value in the packet to the MTU value associated with the egress port.

In a variation on this embodiment, in response to the piece of content being stored locally, the system fragments the piece of content into packets whose sizes are smaller than or equal to the minimum path MTU value carried in the interest packet. The system then sends the content fragments to a node where the interest packet is generated.

In a further variation, the system sets in a content fragment a maximum fragment MTU value that is smaller than or equal to the minimum path MTU.

In a variation on this embodiment, the system maintains a pending interest table, wherein a respective entry in the pending interest table indicates a pending interest, a minimum path MTU associated with the pending interest, and a fragment bitmap that indicates a number of corresponding content fragments that have been provided for the interest.

In a variation on this embodiment, the system receives a content object packet. The system then determines a maximum fragment MTU value of the received content object packet. In response to the content object packet matching the interest packet's HSVLI and the content object packet's maximum fragment MTU value being less than or equal to the minimum path MTU of the interest packet, the system forwards the content object packet to a source node associated with the interest packet.

In a further variation, the system updates a fragment bitmap corresponding to the interest packet, wherein a respective bit in the fragment bitmap indicates whether a corresponding fragment of the content associated with the interest packet's HSVLI has been received.

In a variation on this embodiment, the interest packet includes a fragment stream identifier, a maximum fragment MTU, a fragment count, and a fragment number.

BRIEF DESCRIPTION OF THE FIGURES

In the figures, like reference numerals refer to the same figure elements.

DETAILED DESCRIPTION

Overview

Figure 1:
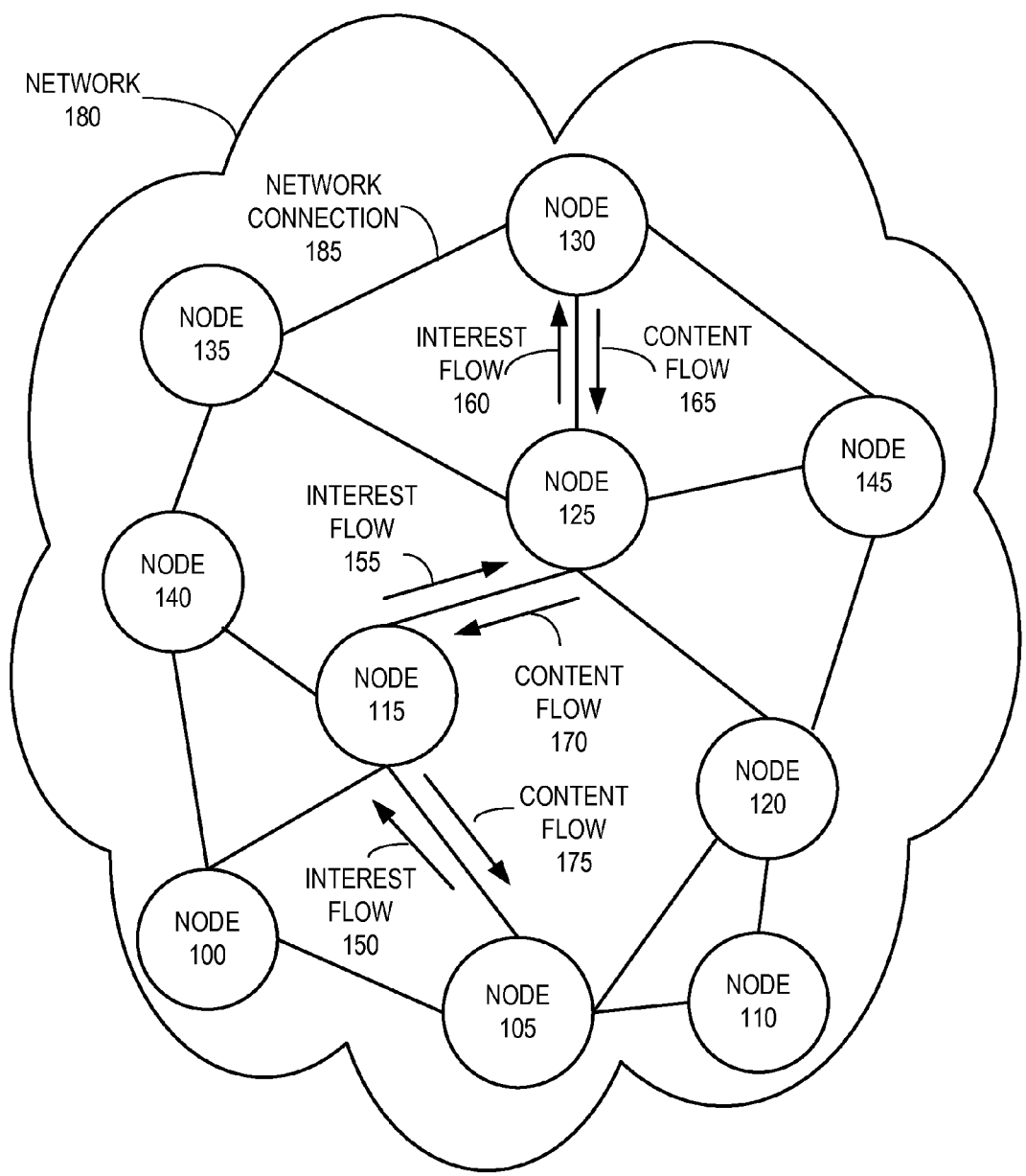
FIG. 1 illustrates an exemplary network where packets have hierarchically structured variable-length identifiers (HSVLIs) in accordance with an embodiment.

Embodiments of the present invention provide a system and method for facilitating an efficient end-to-end fragmentation mechanism for forwarding CCN packets with Hierarchically Structured Variable Length Identifiers (HSVLIs). Typically, when a CCN Interest or Content Object traverses the network from the source to the destination, the corresponding packet(s) traverses multiple links. Depending on the protocol used and the underlying physical transmission medium, each link may impose a different maximum transmission unit (MTU), which is often expressed in bytes. For example, IPv6 requires that all of its data links support a minimum MTU of 1280 bytes. Ethernet data links typically have an MTU of 1500 bytes.

When a node initially sends an Interest for a piece of content, the Interest is contained in a packet, or fragmented into a number packets, within a size that complies with a well-known, predetermined minimum MTU, such that this Interest packet (or packets) is guaranteed to reach any destination without any further fragmentation along the data path. Within the Interest packet's header is a minimum path MTU field, which is updated by each hop (i.e., forwarding device) to record the smallest MTU encountered by the packet along the data path. This way, when the Interest reaches the destination node (i.e., a node that has a copy of the content), the Interest packet would record the minimum path MTU. The destination node then can properly fragment the Content Object to be returned into fragments that are of sizes smaller or equal to the minimum path MTU. As a result, the returned Content Object fragments can successfully reach the source node without any further fragmentation along the same data path.

Note that in this disclosure the minimum path MTU discovery process and the fragmentation mechanism are described using examples in conjunction with hash-based forwarding (see description below). However, the minimum path MTU discovery and fragmentation mechanisms are not limited to such forwarding scheme. Other types of CCN forwarding, such as those based on longest prefix match based on the HSVLI, can also use the same minimum path MTU discovery and fragmentation mechanism.

With hash-based CCN forwarding, a first byte string, referred to as the Similarity Hash (SH), represents the query in an Interest. The Similarity Hash remains invariant as a packet moves through the network. A second byte string, called the Forwarding Hash (FH), represents the longest matching prefix in the routing tables in various forwarding devices (e.g., routers, switches, etc.) along a data path that matches the Interest name. The Forwarding Hash may change hop-by-hop if the underlying routing tables change, such that it always represents the best match at the previous hop. A Content Object, sent in response to an SH/FH Interest, carries the SH/FH header along the return path so the Content Object may be forwarded along the proper path.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation are not limited to such):

"HSVLI": Hierarchically structured variable length identifier, also called a Name. It is an ordered list of Name Components, which may be variable length octet strings. In human-readable form, it can represented in a format such as ccnx:/path/part. There is not a host or query string. As mentioned above, HSVLIs refer to content, and it is desirable that they be able to represent organizational structures for content and at least partially meaningful to humans. An individual component of a HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest": A request for a Content Object that specifies a HSVLI name prefix and other optional selectors to choose among multiple objects with the same name prefix. Any Content Object whose name matches the Interest name prefix and selectors satisfies the Interest. An interest packet is a packet that contains an Interest for a Content Object.

"Content Object": A data object sent in response to an Interest. It has a HSVLI name and a Contents payload that is bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

"Similarity Hash": In an Interest, the Name and several fields called Selectors limit the possible content objects that match the interest. Taken together, they uniquely identify the query in the Interest. The Similarity Hash is a hash over those fields. Two interests with the same SH are considered identical queries.

"Flatname": a CCN name organized as an ordered set of a varint (see below) length and name component bytes.

"Varint": A variable sized unsigned integer encoded, for example, as a series of 7-bit values in big-endian ordered octets. Each high-order octet bit is a continuation bit; if it is set, then the next octet is part of the value.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 105 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

Minimum Path MTU Discovery and Fragmentation

The principle of operation for CCN minimum path MTU discovery and fragmentation is that intermediate systems should not have to fragment packets. This is achieved by an Interest always fragmented (if needed to) to the minimum MTU and recording the forward path's minimum MTU in the Interest packet so a system sending back a Content Object may fragment it to the path's minimum MTU, or smaller. An intermediate system's content store may store only pre-fragmented objects and respond only if those fragments satisfy an Interest's corresponding minimum path MTU. Otherwise, it may be considered a cache miss.

In one embodiment, the well-known minimum MTU by which an Interest is to be fragmented is 1280 octets. Any system having a physical layer with a smaller MTU is expected to implement local link fragmentation and reassembly using, for example, a PPP layer over the smaller-MTU link.

When an end system creates a fragment stream, in one embodiment, it generates a random 64-bit number for the Fragment Stream ID. This number identifies a contiguous stream of fragments. A receiving end system uses the Fragment Stream ID for reassembly. An intermediate system uses the Fragment Stream ID of a Content Object to ensure that only one stream of Content Object fragments follow a reverse Pending Interest Table (PIT, described below) entry.

If, in the unlikely case, the minimum path MTU of a fragment (which is obtained from the minimum path MTU value of an Interest) is larger than the supported MTU on an egress interface of a forwarding device, the fragment stream (and the corresponding Fragment Stream ID) should be dropped on that interface, even if some fragments fit within that interface's MTU.

Note that in the case that hash based forwarding is not used (i.e., in a conventional CCN scenario), the system can use a random number for an Interest's Fragment Stream ID. This can avoid or mitigate the risk of denial of service attacks by malicious nodes replying with useless Content Objects for known Fragment Stream IDs. A fragmented Content Object carries both its own Fragment Stream ID, which is based on the Content Object hash, and the corresponding Interest Fragment Stream ID to facilitate matching on the reserves PIT path.

In some embodiments, fragments are identified by a serial counter, denoted as FragNum, which ranges from 0-63. Forwarders and end systems should drop duplicate fragments, identified by the tuple {SH, FH, Fragment Stream ID, FragNum}. An intermediate system is expected not to re-order fragments. At a system which is re-assembling fragments, it should timeout the reassembly if all fragments are not received within a system-dependent timeout period. If the re-assembly of an Interest times out before the PIT entry, the PIT entry on the local system should be removed to allow a new fragment stream to arrive. If the re-assembly of a Content Object times out, the received fragments bitmap of the PIT (which is maintained as part of the PIT entry to indicate which fragments have been received) should be cleared to allow a new stream of Content Objects to arrive.

If an Interest does not fit with the default minimum MTU (e.g., 1280 bytes), then it is fragmented to fit within the default minimum MTU. In some embodiments, a source node requesting for a piece of content may optionally sends out an Interest packet that contains only the necessary fields (such as content name and encryption key) such that the packet fits within the default minimum MTU (e.g., 1280 bytes). This effectively serves as a minimum path MTU discovery process without fragmenting the interest.

As an Interest traverses intermediate systems, it is forwarded based on the Forwarding Information Bases (FIBs) maintained at each forwarding device. Meanwhile, at each hop, the forwarding device, records the minimum path MTU based on the egress interface's MTU. That is, a forwarding device updates the Interest packet's minimum path MTU field if its local egress interface for this Interest packet has an MTU that is smaller than what is currently written in the packet's minimum path MTU field.

A Content Object sent in response is typically fragmented to less than or equal to the minimum path MTU. A forwarder may choose to put 1280 in the minimum path MTU field even if it supports larger MTUs.

In general, Interests are forwarded based on the FIB information and all fragments of an Interest (i.e. fragments of the same Fragment Stream ID) should follow the same FIB forwarding information. If at a later time a similar Interest arrives with a smaller minimum path MTU, it should be forwarded again, even though it is similar to a previously forwarded Interest with the same HSVLI, to ensure that a returned Content Object is fragmented to a size that satisfies the respective Interest's minimum path MTU. In other words, in some embodiments, Interests with identical HSVLI but different minimum path MTUs are treated as different Interests.

In general, Interests and Content Objects are fragmented in the largest allowable MTU, and only the last fragment is allowed to be less than the maximum allowable MTU. If a fragmented Interest's forwarding hash (FH) does not exactly match the longest matching prefix in the FIB, then the forwarding node can examine the Interest name and compute a new FH (see description on hash-based forwarding below). This requires that the forwarding node reassemble the beginning of the Interest to examine the HSVLI. In a typical case, this means that the node should receive fragment 0 to have sufficient number of prefix name components to compute the new FH. A system may discard all fragments after fragment 0, and once fragment 0 arrives and the system constructs a PIT entry with the proper FH, it can send a Resend Interest control message along the Fragment Stream ID's reverse path to cause the source to resend the Interest stream, which can now be forwarded out of order.

In one embodiment, a system that receives an Interest encapsulated in a packet larger than 1280 octets can silently discard it.

When forwarding a Content Object along the reverse path of a pending Interest, a fragment stream may only be forwarded along the reverse path indicated by a PIT entry for which it satisfies the reverse path minimum MTU.

A PIT entry should only be removed once all fragments of a fragment stream pass through, or it times out. In one embodiment, the value of FragCnt is limited to 0-63, a system may match a first stream's Fragment ID and use a single 64-bit mask or bitmap.

A Content Object is fragmented based on the Interest minimum path MTU. It carries a "Maximum Fragment MTU" field set to the maximum fragment size of the entire fragment stream, which should be less than or equal to an Interest's minimum path MTU. Because a fragment stream may only satisfy PIT entries with larger or equal minimum path MTU, all fragments ideally carry the Content Object's fragmentation size. An intermediate node may, for example, receive the last fragment first, so even if fragments were packed to maximum size, the forwarder could not infer which PIT entries the object satisfies without knowing the fragment stream's fragmentation size.

The examples in this disclosure are mostly described in conjunction with CCN hash forwarding, which is described below.

Hash forwarding relies on each node using the same hash function to encode name prefixes and compute similarity hashes. The hash function and its usage for Hash Forwarding is described below.

In general, a CCN packet, either for an interest or content object, has a header that includes a Similarity Hash (SH) and a Forwarding Hash (FH). SH is used to uniquely identify a piece of content, and can be a hash of the name and one or more fields in the packet. In one embodiment, SH is only computed by the source node that initiates an Interest, and optionally verified by an authoritative source node generating content or responding from a long-term repository. Any two Interests containing the same SH are considered to contain a request for the same piece of content. Any Content Object packet that contains the same SH is considered to be a correct response to the corresponding Interest. In essence, SH can be used in place of the name for purposes of identifying a piece of content.

FH is computed based on one or more components of an Interest packet's name. In general, the source node of an Interest packet may compute FH based on the highest-level hierarchy of the name components (wherein the highest hierarchy is "/"). As the Interest packet travels through the network at each forwarder, the FH may or may not be updated based on the longest match conducted at each forwarder. Every time the FH is updated, it is updated to a hash that corresponds to a more specific subset of the name components. For example, for an Interest packet with a name "/apple/pie/is/good," at the source node a packet's FH might be H{/}. As the packet is forwarded through the network, this FH can be updated to H{/apple/pie/is} and later to H{/apple/pie/is/good}. In general, the FH of a packet could become more or less specific with respect to the name components (which means the match to the name becomes "longer" or "shorter") along the data path toward the destination.

The high-level of CCN hash forwarding operates as follows. A node issues an Interest for a Content Object and receives back at most one Content Object per Interest it sends. The Content Object's name is expected to be equal to or at least match a suffix of the Interest name, and to satisfy the various selectors in the Interest. In embodiments of the present invention, the system speeds up this processing by pre-computing the SH and longest-matching prefix (LMP) FH. The assumption is that the LMP FH does not change frequently in-route, and that intermediate nodes do not need to do much expensive longest match for CCN flatnames. In particular, a forwarder does not necessarily evaluate the name or selectors when matching content in its Content Store (which serves as a cache for previously seen Content Objects). It may use exact match on the SH.

A forwarder typically maintains several data structures: The Pending Interest Table (PIT) tracks outstanding Interests the forwarder has seen, for which the forwarder is awaiting a response. It also aggregates similar Interests (Interest with the same Similarity Hash), so one Content Object may be replicated and forwarded to multiple reverse paths corresponding to multiple pending Interests. The PIT tracks the interfaces out of which an Interest has been sent and ensures that similar Interests are not sent multiple times out the same interfaces. The PIT also ensures that similar Interests can flow in all directions. A forwarder, for example, with three interfaces 1, 2 and 3, may forward an interest received from interface 1 toward interfaces 2 and 3. At a later time, it receives a similar Interest from Interface 2. It may forward that Interest out of interface 1, but not 3.

The Content Store (CS) is an optional component. It stores recently seen or high-value Content Objects so later requests for the same object can be answered without forwarding an Interest. Cache policy and retention policy can be applied.

The Forwarding Information Base (FIB) contains information indicating the Interest forwarding routes. Typically, a routing protocol is used to populate the FIB. In one embodiment, the entries in the FIB are indexed based on the Forwarding Hashes.

In general, a forwarder matches both the SH and FH of an Interest on the return path of a Content Object. This is because a malicious user could put in an SH for /popular/content and an FH for a /colluding/site, for example. The content object form /colluding/site would have malicious content, but an SH for /popular/content would be benign. If forwarders do not validate that the Content Object matches the full pending Interest with both SH and FH, and only reverse-path forwards with the SH, the malicious content could pollute the network.

To summarize the behavior of forwarding, an Interest is forwarded based on its FH. If an intermediate node has a more specific route (i.e., a forwarding entry that matches a longer portion of the name), it may update the FH to the more specific hash. When a Content Object is returned, an intermediate node will re-swap the FH label. When an intermediate node receives a Content Object, it verifies that it came from the expected direction, based on the PIT entry and SH/FH headers. An exception to this is if an Interest was routed along the default route (an empty FH), then the FH header in the Content Object is not swapped.

A PIT entry stores the SH, which is invariant in forwarding, the ingress FH, and the egress FH. The egress FH matches a Content Object's FH when it is received, and the ingress FH is label swapped to the Content Object when it is reverse-path forwarded toward the owner of the Interest. It is possible that the PIT stores multiple ingress FH's.

During operation, when a node creates an Interest, the node encapsulates the Interest in a header. It computes the Similarity Hash and places it in the header's SH field. If the node has knowledge of the proper Forwarding Hash, it places the FH in the FH field. The node then sends the Interest packet to the next-hop forwarder.

A node may obtain the FH in several ways: hash the first name component; use a directory service; use the FH returned in a Content Object from a previous Interest for the same prefix; or encode the FH in a specific link format.

When a forwarder receives an Interest on an ingress interface, it performs the following actions: The forwarder looks up the SH/FH in the PIT. If no entry exists, it creates a PIT entry for the Interest, then proceeds to check the Content Store. To create a PIT entry, the forwarder records the SH and FH of the Interest and notes the ingress port on which the Interest is received. If the remaining time of the PIT entry is less than the Interest's requested holdtime, the forwarder can extend the PIT entry's remaining time. Note that the holdtime is a suggested maximum time to hold the Interest in a PIT. The forwarder then proceeds to forward the Interest.

If a forwarder implements a Content Store, it can look up the FH in the FIB, and determine if there is a more specific route FH' (which is an FH corresponding to a longer, or more specific, portion of the name). If not, set FH'=FH. The forwarder then matches the SH and FH' in the Content Store. If there is an exact match, the forwarder returns the Content Object and consumes the PIT entry. The returned object carries SH/FH, unless FH was the default route, in which case it carries SH/FH'. If there is no exact match in the Content Store, the forwarder forwards the Interest.

To forward the Interest, the forward first looks up the FH in the FIB and finds the longest matching prefix in the FIB, based on the name of the Interest, then forwards the Interest out those ports. The forwarder is precluded from forwarding the Interest on the port from which it is received. Call the longest matching FIB forwarding hash FH' and the set of egress interfaces E. As an example, if the FIB is a hash table, the forwarder looks up the FH as the key. If the entry exists and it has no children (meaning that there does not exist a longer match with the Interest's name), the forwarder uses that FIB entry. If the entry has one or more children, the forwarder examines the children to determine if a longer match is possible. The forwarder then removes the Interest's ingress interface from E. The forwarder further looks up the SH/FH' in the PIT. If the Interest's hop limit (as decremented above) is greater than the PIT entries "maximum hop limit", the forwarder sets the PIT entry's maximum hop limit to the Interest's hop limit, and internally marks the Interest as "hop limit extended." If the Interest is not marked as "hop limit extended," the forwarder removes any egress interfaces already used from E. In addition, the forwarder links SH/FH' to SH/FH, if they are different. This may be a one to many mapping relationship. If E is not empty, the forwarder updates the FH in the interest with the longest matching FIB hash, and then forwards the Interest.

If an end-system content producer receives an Interest, it may create a Content Object that satisfies the body of the Interest and return it along the reverse path. The returned object carries the SH/FH received in the Interest. An end system may verify that the SH is properly calculated to match the body of the Interest.

An intermediate forwarder receiving a Content Object first verifies whether the SH and FH of the received Content Object are in the PIT. If they are not, the forwarder drops the Content Object. The forwarder then verifies that the Content Object arrived from a port over which a corresponding Interest was previously forwarded, or over which the corresponding Interest could have been forwarded. If this condition is not met, the forwarder drops the Content Object.

If the forwarder implements a Content Store, the forwarder adds the object to the store if the object's holdtime permits it. Then the forwarder forwards the object along the reverse path, label swapping the object's FH to the reverse path's FH, except if the reverse path FH was the default route (empty) in which case the forwarder does not change the FH. This is done by following the links from SH/FH' to SH/FH, if any exists. Subsequently, the forwarder consumes the PIT entries satisfied by the Content Object.

An end system receiving a Content Object should verify that the Content Object actually satisfies the original Interest. It should also verify the integrity of the Content Object's hash and signature.

Note that in conventional CCN forwarding schemes (i.e., not based on hash forwarding), an Interest with a long HSVLI might not fit within the default minimum path MTU and be fragmented into multiple packets. To properly forward such an interest, an intermediary system may choose to wait for all or a subset of the fragments to arrive so that it can assemble a sufficient portion of the HSVLI to perform a longest-match prefix lookup.

Figure 2A:
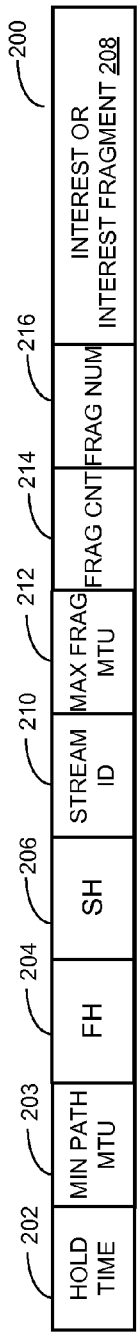
FIG. 2A illustrates an exemplary Interest header for a CCN packet facilitating minimum path MTU discovery, in accordance with an embodiment of the present invention.

FIG. 2A illustrates an exemplary Interest header for a CCN packet facilitating minimum path MTU discovery, in accordance with an embodiment of the present invention. In this example, a CCN Interest packet 200 includes a payload portion 208 and a hash forwarding header, which in turn can include a holdtime field 202, a minimum path MTU field 203, an FH field 204, and an SH field 206. Payload portion 208 may include the Interest or an Interest fragment, which may in turn include the full CCN content name (i.e., HSVLI), and additional fields associated with the Interest.

Holdtime field 202 indicates the holdtime which is a suggested maximum time to hold the message at a forwarder. For an Interest, the holdtime is the desired time to keep the Interest in the PIT until a response comes. For a Content Object, the holdtime is the maximum time to keep the Content Object in the fast response cache.

Minimum path MTU field 203 is used to record the minimum MTU among all the links packet 200 has traversed so far. For example, at the source node which generates Interest packet 200, minimum path MTU field 203 is set to contain the MTU value of the egress port at the source node. Minimum path MTU field 203 is then checked and updated if necessary at each hop, if an egress port at an intermediary system has a smaller MTU value than what is recorded in minimum path MTU field 203.

Also included in Interest packet 200 is a fragment header 211, which in turn includes a fragment stream ID 210, a maximum fragment MTU 212, a fragment count 214, and a fragment number 216. Fragment stream ID 210 uniquely identifies a particular stream of fragments corresponding to the Interest. Maximum fragment MTU 212 indicates the largest size of all the fragments in the stream. Fragment count 214 indicates the total number of fragments in the stream. In one embodiment, the total number of fragments in any stream is less than or equal to 64. Fragment number 216 indicates the index for the current fragment. These fields in fragment header 211 jointly allow a receiving end system to reassemble the fragment stream.

In one embodiment, the Similarity Hash is only computed by the source node, and optionally verified by an authoritative source node generating content or responding from a long-term repository. The Similarity Hash can use the SHA-256 hashing algorithm.

The Forwarding Hashes can be computed in a similar way. The Forwarding Hash is used and possibly computed by forwarding nodes based on entries in their FIB table. Speed of computation is important, and collision resistance only needs to be good enough to distinguish between allowed routing names. In one embodiment, the Forwarding Hash uses FNV-1a 128-bit [FNV] with the standard FNV_offset and FNV_prime:

$$FNV\_prime =$$
$$2^{}88 + 2^{}8 + 0 \times 3B = 309{,}485{,}009{,}821{,}345{,}068{,}724{,}781{,}371 =$$
$$0 \times 00000000\ 01000000\ 00000000\ 0000013B;$$

and $$FNV\_offset = 144{,}066{,}263{,}297{,}769{,}815{,}596{,}495{,}629{,}667{,}062{,}367{,}629 =$$
$$0 \times 6C62272E\ 07BB0142\ 62B82175\ 6295C58D.$$

To compute a Forwarding Hash over a CCN name, the system can run the FNV-1a 128-bit over each name component using the flatname format, in cumulative order, to the desired number of components.

Figure 2B:
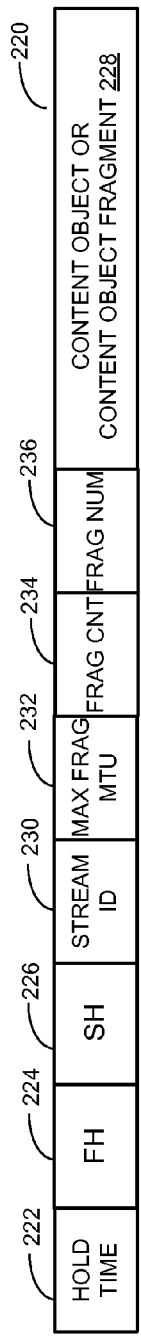
FIG. 2B illustrates an exemplary Content Object header for a CCN packet facilitating fragmentation, in accordance with an embodiment of the present invention.

FIG. 2B illustrates an exemplary Content Object header for a CCN packet facilitating fragmentation, in accordance with an embodiment of the present invention. In this example, a CCN Content Object packet 200 includes a payload portion 228 and a hash forwarding header, which in turn can include a holdtime field 222, an FH field 204, and an SH field 206. Payload portion 228 may include the Content Object or Content Object fragment, which may in turn include the full CCN content name (i.e., HSVLI), and additional fields associated with the Content Object. Note that Content Object packet 220 does not contain a minimum path MTU field. This is because any Content Object fragment packet should be within the minimum path MTU as received in the corresponding Interest packet.

Also included in Content Object packet 220 is a fragment header 231, which in turn includes a fragment stream ID 230, a maximum fragment MTU 232, a fragment count 234, and a fragment number 236. Fragment stream ID 230 uniquely identifies a particular stream of fragments corresponding to the Content Object. Maximum fragment MTU 232 indicates the largest size of all the fragments in the fragment stream. Fragment count 234 indicates the total number of fragments in the stream. Fragment number 236 indicates the index for the current fragment. These fields in fragment header 231 jointly allow a receiving end system to reassemble the fragment Content Object.

Figure 3:
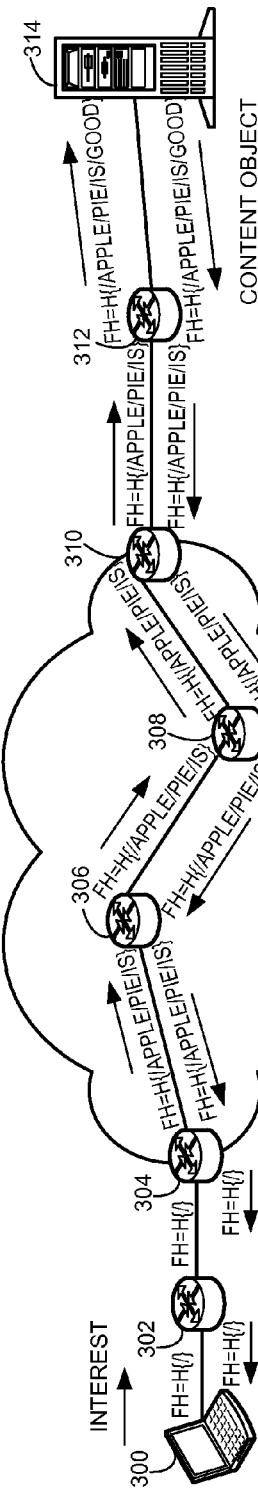
FIG. 3 illustrates the process of forwarding an Interest and a corresponding Content Object, in accordance with an embodiment of the present invention.

FIG. 3 illustrates the process of forwarding an Interest and a corresponding Content Object, in accordance with an embodiment of the present invention. In this example, a client end system 300 is coupled to a network 300 and wishes to obtain content named /apple/pie/is/good from a content server 314. A number of forwarding nodes, such as forwarders 302, 304, 306, 308, 310, and 312, couple end system 300 with content server 314. In one embodiment, these forwarders can be IP routers. In this example, forwarders 302 and 312 can be enterprise gateway routers for the respective enterprise networks associated with end system 300 and content server 314. Forwarders 304 and 310 can be edge routers providing access into core network 300 to the enterprise networks.

During operation, end system 300 initiates an Interest for /apple/pie/is/good. The Interest packet has its minimum path MTU set to be the MTU of the link to router 302. Assuming that end system 300 has no knowledge about how to forward the Interest packet, end system 300 forwards the Interest to the default gateway router 302, setting the Interest's FH to H{/}, that is, the FH is computed based on the highest hierarchy "/" in the HSVLI. Gateway router 302 also has no specific routing information on how to forward the Interest for /apple/pie/is/good, so it forwards it to edge router 304 with the same FH. In addition, gateway router 302 checks its egress port's MTU and, if this MTU is less than the minimum path MTU in the Interest packet, updates the minimum path MTU in the packet. Similarly, every router along the data path toward content server 314 checks its egress port MTU before forwarding the Interest, and if the egress port MTU is less than the minimum path MTU carried in the packet, updates the minimum path MTU value.

Assuming that edge router 304 has routing information for /apple/pie/is, edge router then replaces the Interest's FH with H{/apple/pie/is}. Subsequently, core routers 306 and 308 can forward the Interest based on this updated FH through core network 300 without having to parse the full HSVLI, using an exact match of the FH in their respective FIB. When the Interest reaches edge router 310, edge router 310 forwards the Interest, based on the same FH=H{/apple/pie/is/good}, to gateway router 312, which is within the enterprise network where content server 314 resides. Since gateway router 312 has the routing information for the full HSVLI /apple/pie/is/ good, gateway router 312 replaces the FH with H{/apple/pie/is/good}, and forwards the Interest to content server 314.

When content server 314 returns a Content Object, it first fragments the Content Object to fragments of sizes smaller than or equal to the minimum path MTU. It sets the Content Object packet's SH to be the same SH as the Interest, and the FH to be H{/applie/pie/is/good}. Subsequently, the Content Object is reverse-path forwarded back to end system 300. At each hop, the FH of the Content Object is updated so that it matches the FH of the Interest that was previously received on the same link where the Content Object is to be forwarded. For example, at router 312, the Content Object's FH is replaced with H{/apple/pie/is}, and at edge router 304 the FH is again replaced with H{/}. This reverse-path forwarding mechanism ensures that the Content Object travels along the same data path on which the Interest has traveled, and hence can prevent any malicious entity from tampering with or spoofing the returned Content Object.

Figure 4:
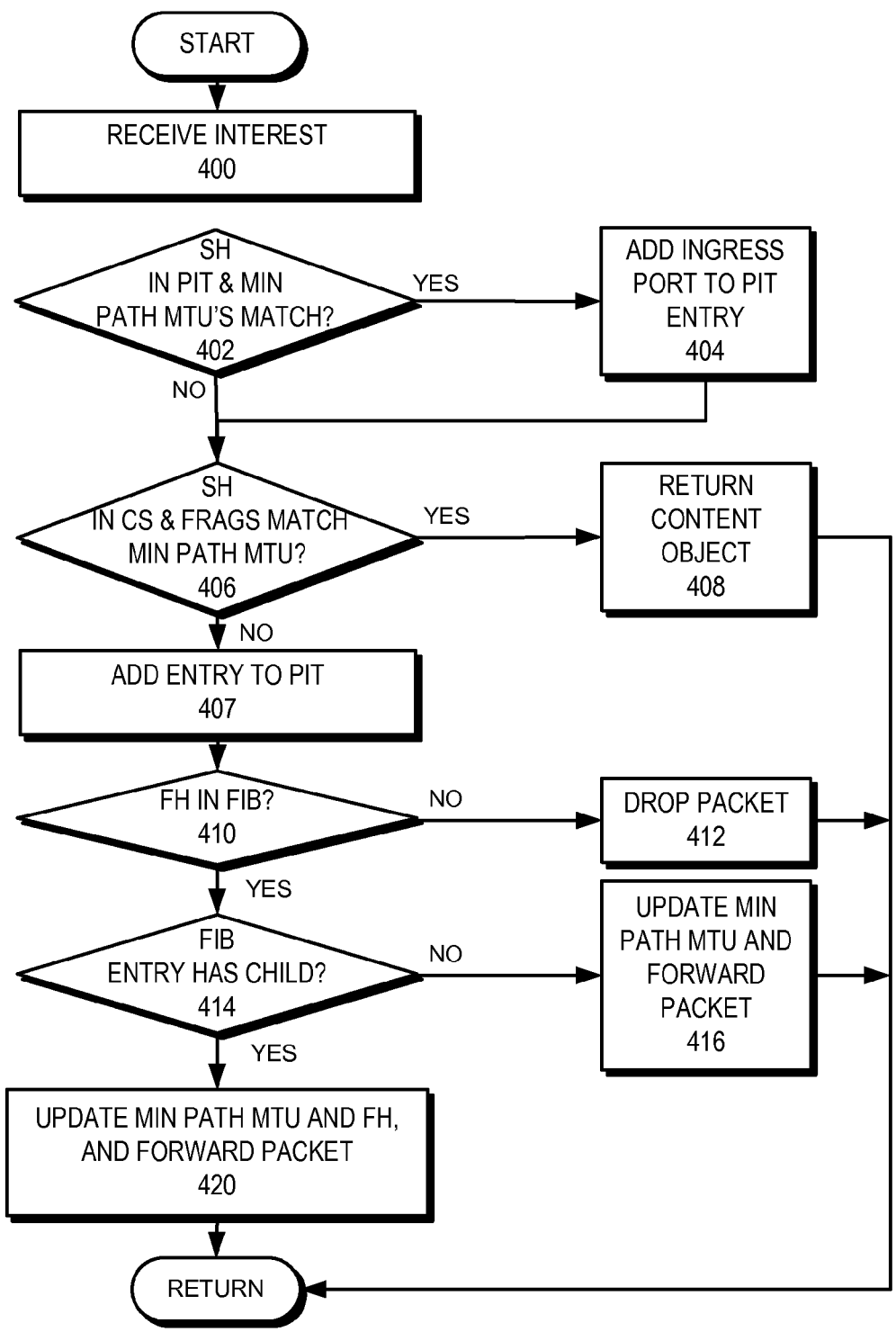
FIG. 4 presents a flow chart illustrating the process of receiving and forwarding an Interest, in accordance with an embodiment of the present invention.

FIG. 4 presents a flow chart illustrating the process of receiving and forwarding an Interest, in accordance with an embodiment of the present invention. During operation, the system receives an Interest (operation 400). The system then determines whether the SH of the Interest is in the PIT and the received Interest's minimum path MTU matches the minimum path MTU of the corresponding entry in the PIT (operation 402). If so, the system adds the ingress port on which the Interest is received to the corresponding PIT entry (operation 404). Otherwise, which means (1) the SH is not in the PIT, or (2) the SH is in the PIT but the pending interest in the PIT entry has a minimum path MTU that is greater than the minimum path MTU in the received Interest, the system further determines whether the content corresponding to the SH is in the local Content Store and that the locally stored Content Object is fragmented in compliance with the Interest's minimum path MTU (operation 406). If so, the system returns the matching Content Object (operation 408). If not, the system then adds a corresponding entry to the PIT with the Interest's minimum path MTU (operation 407).

Next, the system determines whether the Interest's FH is in the FIB (operation 410). If the FH is not in the FIB, the system drops the Interest packet (operation 412). If the FH is in the FIB, the system further determines whether the corresponding FIB entry has a child, which means that the FIB contains a longer prefix match than the current FH indicates (operation 414). If the FIG entry does not have a child, the system then updates the Interest's minimum path MTU (if the egress port's MTU is less than the minimum path MTU currently carried in the packet) and forwards the Interest packet based on the egress port indicated by the FIB entry (operation 416). If the FIB entry has a child, the system then updates the Interest packet's FH based on the longer prefix match indicated by the child by rehashing the matched prefix, updates the Interest's minimum path MTU if necessary, and forwards the packet accordingly (operation 420).

Figure 5:
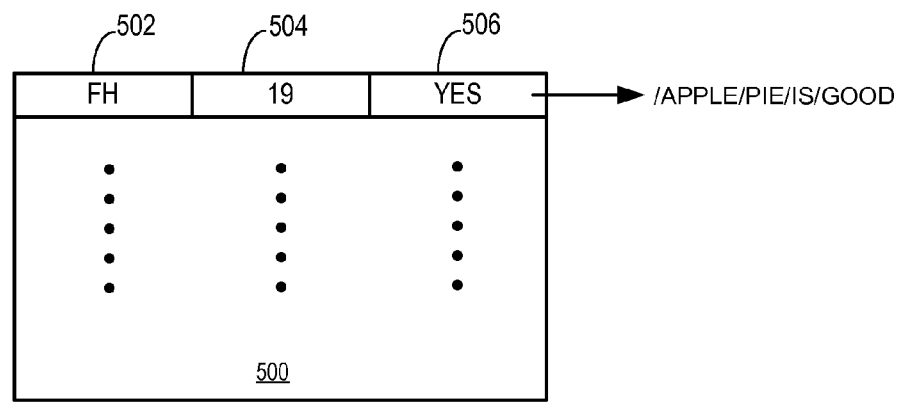
FIG. 5 illustrates an exemplary forwarding information base (FIB), in accordance with an embodiment of the present invention.

FIG. 5 illustrates an exemplary forwarding information base (FIB), in accordance with an embodiment of the present invention. In this example, a FIB 500 includes an FH column 502, an egress port(s) column 504, and a child indication column 506. FH column 502 stores the FHs for which the FIB maintains the proper forwarding (i.e., egress port(s)) information. Egress port(s) column 504 indicates one or more egress ports via which an Interest packet can be forwarded.

Child indication column 506 stores an indicator which indicates whether the forwarder has a longer prefix match for the HSVLI associated with the current FH. In one embodiment, child indication column 506 stores a pointer to the longer prefix match, based on which the system can re-compute the FH.

Figure 6:
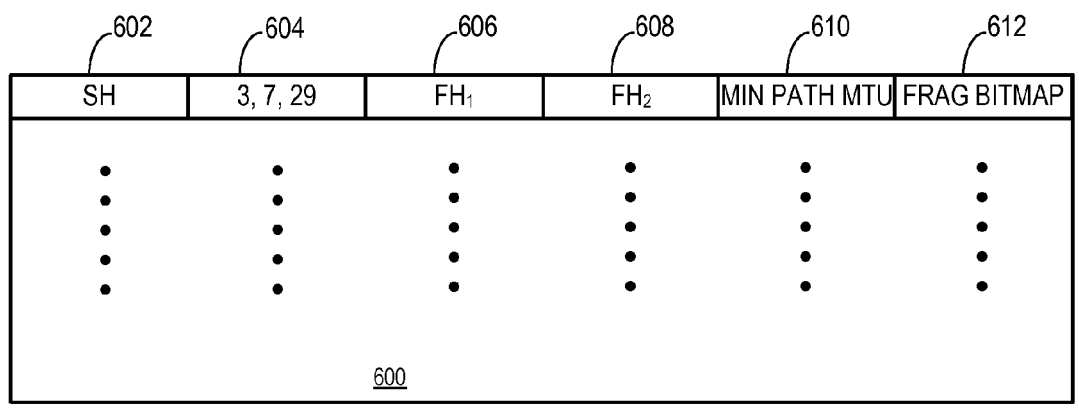
FIG. 6 illustrates an exemplary pending Interest table (PIT), in accordance with an embodiment of the present invention.

FIG. 6 illustrates an exemplary pending Interest table (PIT), in accordance with an embodiment of the present invention. In this example, a PIT 600 includes an SH column 602, an ingress port(s) column 604, an egress FH column 606, an ingress FH column 608, a minimum path MTU column 610, and a fragment bitmap column 612. SH column 602 stores the SH for a pending Interest and is used to look up a pending Interest in PIT 600. Ingress port(s) column 604 indicates one or more ingress ports on which an Interest is received. These ports will be used to send back the Content Objects corresponding to the pending Interest. Egress FH column 606 indicates the FH a corresponding received Content Object should have, which is used to confirm that the Content Object is received via the correct reverse path. Ingress FH column 608 indicates the new FH that should be used to update the old FH of a received Content Object. Note that the terms "egress" and "ingress" are used here with reference to the corresponding Interest, not the Content Object.

Minimum path MTU column 610 indicates the minimum path MTU for the corresponding Interest. A Content Object fragment can only satisfy this interest if its maximum fragment MTU value (see field 232 in FIG. 2B) is less than the minimum path MTU. Fragment bitmap column 612 stores a bitmap (e.g., a 64-bit long bitmap) that indicates whether all the Content Object fragments have been received. Once all the bits in the fragment bitmap are "1," for example, the system can remove the corresponding Interest entry from PIT 600.

Figure 7:
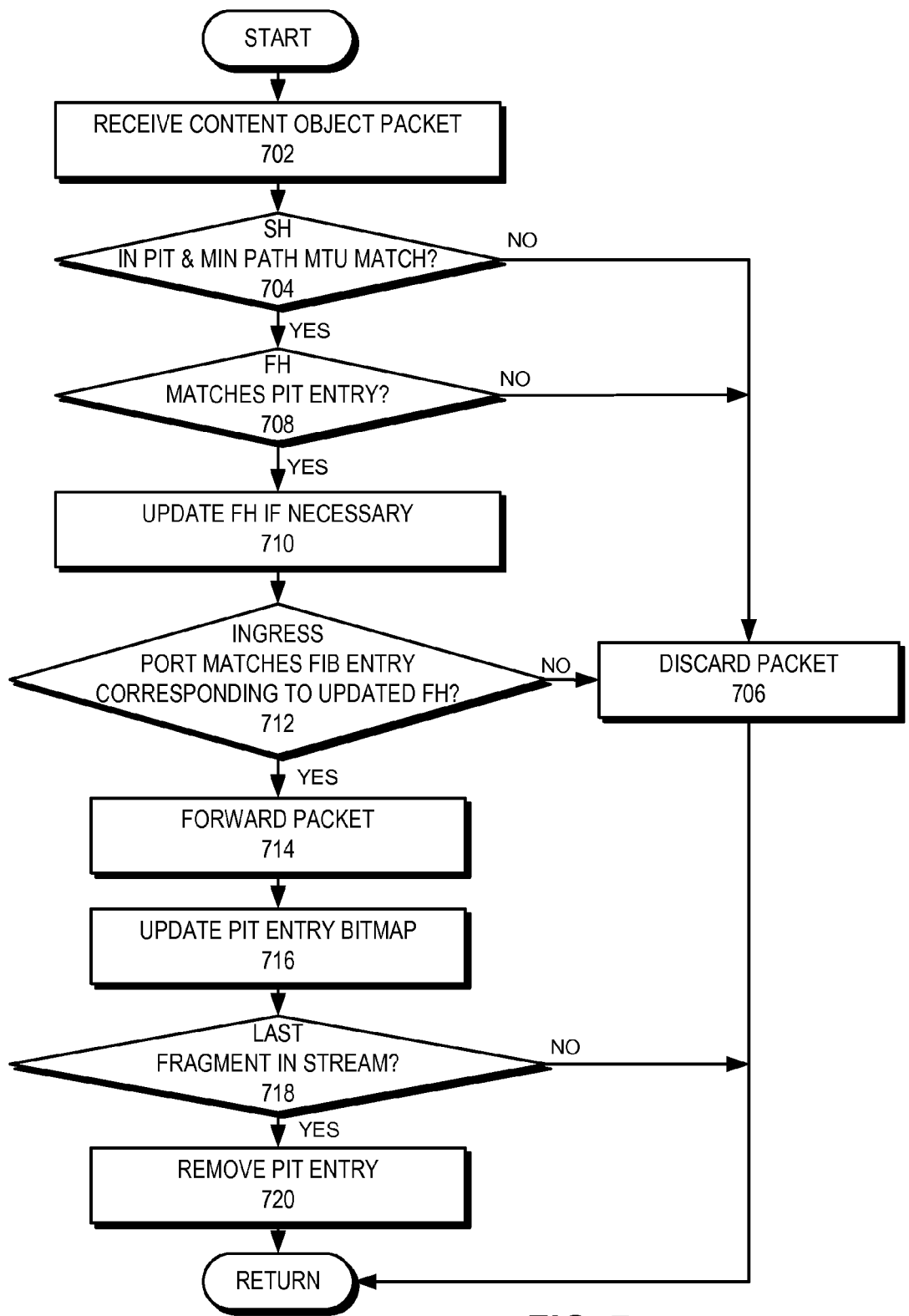
FIG. 7 presents a flow chart illustrating an exemplary process of receiving and forwarding a Content Object, in accordance with an embodiment of the present invention.

FIG. 7 presents a flow chart illustrating an exemplary process of receiving and forwarding a Content Object, in accordance with an embodiment of the present invention. During operation, the system first receives a Content Object packet (operation 702). The system then determines whether the SH of the Content Object is in the PIT and whether the Content Object's maximum fragment MTU matches the corresponding pending Interest's minimum path MTU (operation 704). If it is not in the PIT, or if the Content Object's maximum fragment MTU does not match the pending Interest's minimum path MTU, the system discards the packet (operation 706). Otherwise, the system further determines whether the FH in the Content Object matches the egress FH (corresponding to egress FH column 606 in FIG. 6) in the corresponding PIT entry (operation 708). If not, the system discards the packet (operation 706). Otherwise, the system updates the Content Object's FH, if the corresponding PIT entry indicates that a different FH should be used for the Content Object before it is sent out (corresponding to ingress FH column 608 in FIG. 6) (operation 710).

Subsequently, the system determines whether the ingress port on which the Content Object is received matches the FIB entry corresponding to the updated FH (operation 712). If not, the system discards the packet (operation 706). Otherwise, the system forwards the Content Object packet to the ports indicated by the PIT entry (corresponding to ingress port(s) column 604 in FIG. 6) (operation 714).

In addition, the system updates the fragment bitmap in the corresponding PIT entry (operation 716). The system then determines whether the Content Object fragment that it has forwarded is the last fragment in the stream by inspecting the fragment bitmap (operation 718). If so, the system removes the corresponding PIT entry (operation 720). Otherwise, the system is ready to receive the next Content Object fragment.

Figure 8:
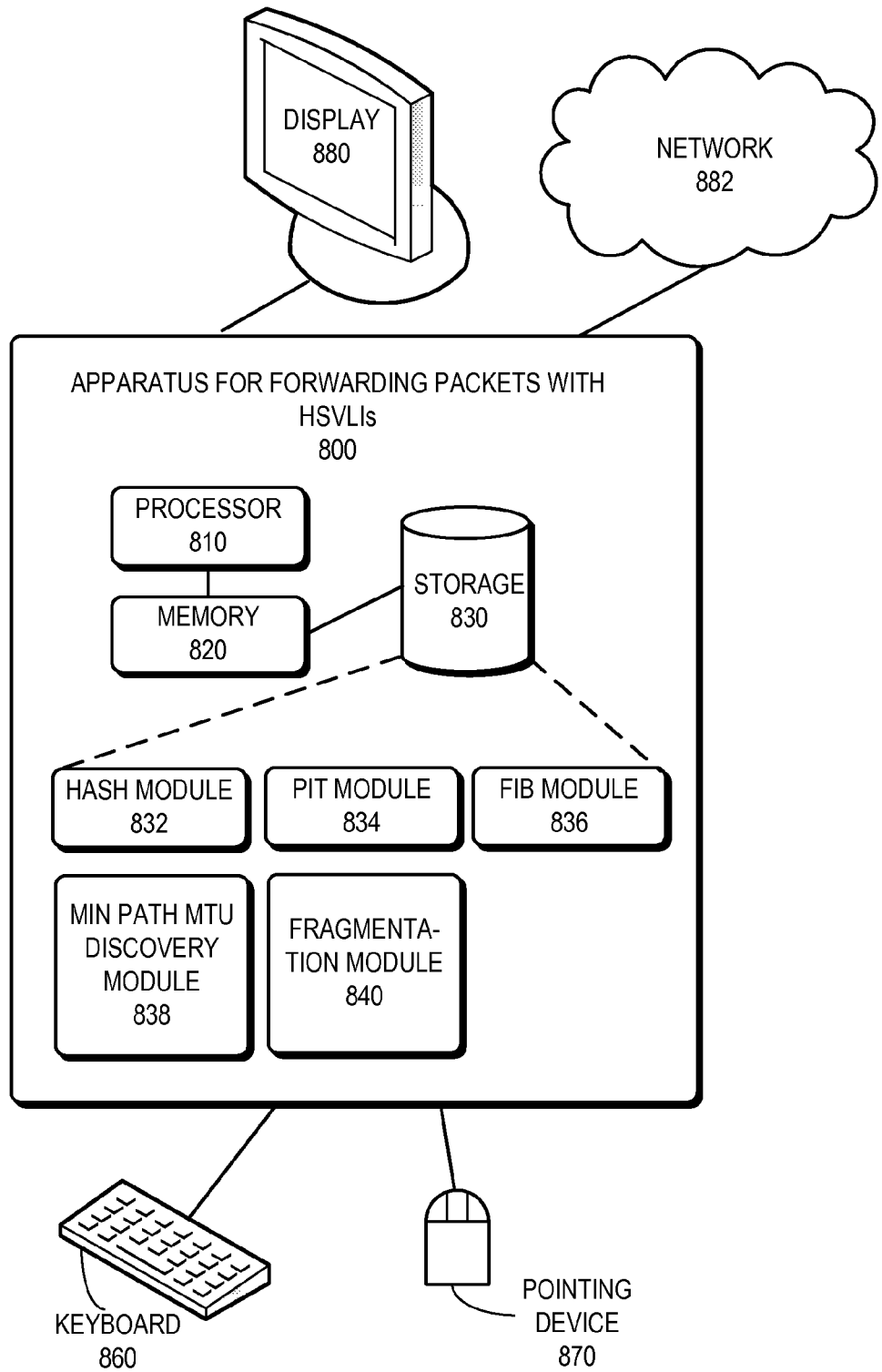
FIG. 8 illustrates an exemplary system for forwarding packets with HSVLIs, in accordance with an embodiment.

FIG. 8 illustrates an exemplary system for forwarding packets with HSVLIs, in accordance with an embodiment. A system 800 for forwarding packets with HSVLIs comprises a processor 810, a memory 820, and a storage 830. Storage 830 typically stores instructions which can be loaded into memory 820 and executed by processor 810 to perform the hash-forwarding methods mentioned above. In one embodiment, the instructions in storage 830 can implement a hash module 832, a PIT module 834, a FIB module 836, A minimum path MTU discovery module 838, and a fragmentation module 840, all of which can be in communication with each other through various means.

In some embodiments, modules 832, 834, 836, 838, and 840 can be partially or entirely implemented in hardware and can be part of processor 810. Further, in some embodiments, the system may not include a separate processor and memory. Instead, in addition to performing their specific tasks, modules 832, 834, 836, 838, and 840 either separately or in concert, may be part of general- or special-purpose computation engines.

Storage 830 stores programs to be executed by processor 810. Specifically, storage 830 stores a program that implements a system (application) for performing hash-based forwarding of packets with HSVLIs. During operation, the application program can be loaded from storage 830 into memory 820 and executed by processor 810. As a result, system 800 can perform the functions described above. System 800 can be coupled to an optional display 880, keyboard 860, and pointing device 870, and also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for facilitating fragmentation of packets with hierarchically structured variable-length identifiers (HSVLIs), the method comprising:
   receiving an interest packet with an HSVLI corresponding to a piece of content;
   identifying a minimum path maximum transmission unit (MTU) value carried in the interest packet;
   in response to the piece of content not being stored locally, determining an egress port for the interest packet based on the HSVLI;
   determining an MTU associated with the egress port;
   in response to the MTU associated with the egress port being less than the minimum path MTU value carried in the interest packet, updating the minimum path MTU value in the interest packet to the MTU value associated with the egress port; and
   in response to determining that an HSVLI of a received content object packet matches the HSVLI of the interest packet, and that a maximum fragment MTU value of the content object packet is less than or equal to the minimum path MTU carried in the interest packet, forwarding the content object packet to a source node associated with the interest packet.

2. The method of claim 1, further comprising:
   in response to the piece of content being stored locally, fragmenting the piece of content into packets whose sizes are smaller than or equal to the minimum path MTU value carried in the interest packet; and
   sending the content fragments to a node where the interest packet is generated.

3. The method of claim 2, further comprising setting in a content fragment a maximum fragment MTU value that is smaller than or equal to the minimum path MTU.

4. The method of claim 1, further comprising maintaining a pending interest table, wherein a respective entry in the pending interest table indicates a pending interest, a minimum path MTU associated with the pending interest, and a fragment bitmap that indicates a number of corresponding content fragments that have been provided for the interest.

5. The method of claim 1, further comprising:
   receiving the content object packet; and
   determining the maximum fragment MTU value of the received content object packet.

6. The method of claim 5, further comprising updating a fragment bitmap corresponding to the interest packet, wherein a respective bit in the fragment bitmap indicates whether a corresponding fragment of the content associated with the interest packet's HSVLI has been received.

7. The method of claim 1, wherein the interest packet includes a fragment stream identifier, a maximum fragment MTU, a fragment count, and a fragment number.

8. A system for facilitating fragmentation of packets with hierarchically structured variable-length identifiers (HSVLIs), the system comprising:
   a processor; and
   a storage device storing instructions which when executed by the processor cause the processor to perform a method, the method comprising:
      receiving an interest packet with an HSVLI corresponding to a piece of content;
      identifying a minimum path maximum transmission unit (MTU) value carried in the interest packet;

in response to the piece of content not being stored locally, determining an egress port for the interest packet based on the HSVLI;

determining an MTU associated with the egress port;

in response to the MTU associated with the egress port being less than the minimum path MTU value carried in the interest packet, updating the minimum path MTU value in the interest packet to the MTU value associated with the egress port; and in response to determining that an HSVLI of a received content object packet matches the HSVLI of the interest packet, and that a maximum fragment MTU value of the content object packet is less than or equal to the minimum path MTU carried in the interest packet, forwarding the content object packet to a source node associated with the interest packet.

9. The system of claim 8, wherein the method further comprises:

in response to the piece of content being stored locally, fragmenting the piece of content into packets whose sizes are smaller than or equal to the minimum path MTU value carried in the interest packet; and sending the content fragments to a node where the interest packet is generated.

10. The system of claim 9, wherein the method further comprises setting in a content fragment a maximum fragment MTU value that is smaller than or equal to the minimum path MTU.

11. The system of claim 8, wherein the method further comprises maintaining a pending interest table, wherein a respective entry in the pending interest table indicates a pending interest, a minimum path MTU associated with the pending interest, and a fragment bitmap that indicates a number of corresponding content fragments that have been provided for the interest.

12. The system of claim 8, wherein the method further comprises:

receiving the content object packet; and determining the maximum fragment MTU value of the received content object packet.

13. The system of claim 12, wherein the method further comprises updating a fragment bitmap corresponding to the interest packet, wherein a respective bit in the fragment bitmap indicates whether a corresponding fragment of the content associated with the interest packet's HSVLI has been received.

14. The system of claim 8, wherein the interest packet includes a fragment stream identifier, a maximum fragment MTU, a fragment count, and a fragment number.

15. A non-transitory storage medium storing instructions which when executed by a processor cause the processor to perform a method for facilitating fragmentation of packets with hierarchically structured variable-length identifiers (HSVLIs), the method comprising:

receiving an interest packet with an HSVLI corresponding to a piece of content;

identifying a minimum path maximum transmission unit (MTU) value carried in the interest packet;

in response to the piece of content not being stored locally, determining an egress port for the interest packet based on the HSVLI;

determining an MTU associated with the egress port;

in response to the MTU associated with the egress port being less than the minimum path MTU value carried in the interest packet, updating the minimum path MTU value in the interest packet to the MTU value associated with the egress port; and in response to determining that an HSVLI of a received content object packet matches the HSVLI of the interest packet, and that a maximum fragment MTU value of the content object packet is less than or equal to the minimum path MTU carried in the interest packet, forwarding the content object packet to a source node associated with the interest packet.

16. The non-transitory storage medium of claim 15, wherein the method further comprises:

in response to the piece of content being stored locally, fragmenting the piece of content into packets whose sizes are smaller than or equal to the minimum path MTU value carried in the interest packet; and sending the content fragments to a node where the interest packet is generated.

17. The non-transitory storage medium of claim 16, wherein the method further comprises setting in a content fragment a maximum fragment MTU value that is smaller than or equal to the minimum path MTU.

18. The non-transitory storage medium of claim 15, wherein the method further comprises maintaining a pending interest table, wherein a respective entry in the pending interest table indicates a pending interest, a minimum path MTU associated with the pending interest, and a fragment bitmap that indicates a number of corresponding content fragments that have been provided for the interest.

19. The non-transitory storage medium of claim 15, wherein the method further comprises:

receiving the content object packet; and determining the maximum fragment MTU value of the received content object packet.

20. The non-transitory storage medium of claim 19, wherein the method further comprises updating a fragment bitmap corresponding to the interest packet, wherein a respective bit in the fragment bitmap indicates whether a corresponding fragment of the content associated with the interest packet's HSVLI has been received.

21. The non-transitory storage medium of claim 15, wherein the interest packet includes a fragment stream identifier, a maximum fragment MTU, a fragment count, and a fragment number.

* * * * *